United States Patent [19]

Ash et al.

[11] 4,076,583

[45] Feb. 28, 1978

[54] CONTROL FOR NUCLEAR REACTOR

[75] Inventors: Edward B. Ash, Marina Del Rey; Louis Bernath, San Diego; Joseph V. Facha, Reseda, all of Calif.

[73] Assignee: Rockwell International Corporation, El Segundo, Calif.

[21] Appl. No.: 729,539

[22] Filed: Oct. 4, 1976

[51] Int. Cl.² ............................................. G21C 7/16
[52] U.S. Cl. .................................. 176/35; 176/86 R; 176/36 R
[58] Field of Search ..................... 176/86 R, 36 R, 35, 176/22

[56] References Cited

U.S. PATENT DOCUMENTS

| | | | |
|---|---|---|---|
| 3,228,847 | 1/1966 | Parkinson et al. | 176/86 R |
| 3,257,286 | 6/1966 | Ryon et al. | 176/86 R |
| 3,287,910 | 11/1966 | Silverstein | 176/35 |
| 3,347,747 | 10/1967 | West et al. | 176/86 R |

*Primary Examiner*—Harvey E. Behrend
*Attorney, Agent, or Firm*—L. Lee Humphries; Henry Kolin; Clark E. DeLarvin

[57] ABSTRACT

A nuclear reactor having an inherently safe automatic shutdown capability comprising a pressure vessel, a core located within the vessel and containing a sufficient amount of fissionable material to establish and sustain a chain-type fission reaction, and a plurality of elongated conduits disposed in a regular arrangement within the vessel. Each of the conduits defines a fluid flow path and comprises a first section located within and extending through the core, and a second section located exteriorly of the core and positioned above the first section. Each of the conduits contains a plurality of substantially spherical bodies in a sufficient quantity to substantially fill the first section of each of the conduits. The conduits are provided with a first fluid connection to a lower part of the first section and a second fluid connection to an upper part of the second section for the passage of a pressurized fluid therethrough while maintaining the reactor in operation. The nuclear reactor further comprises a means for supplying the pressurized fluid to said first fluid connection for moving all of said plurality of bodies from said first section to said second section of each of the elongated conduits to form a hydraulically stacked bed of the spherical bodies. A bypass means is located intermediate the second fluid connection, and the second section of each of the conduits and includes a plurality of fluid passageways distributed along the length of the second section for permitting a portion of the pressurized fluid to bypass a portion of the stacked bed of bodies during normal operation of the reactor.

5 Claims, 7 Drawing Figures

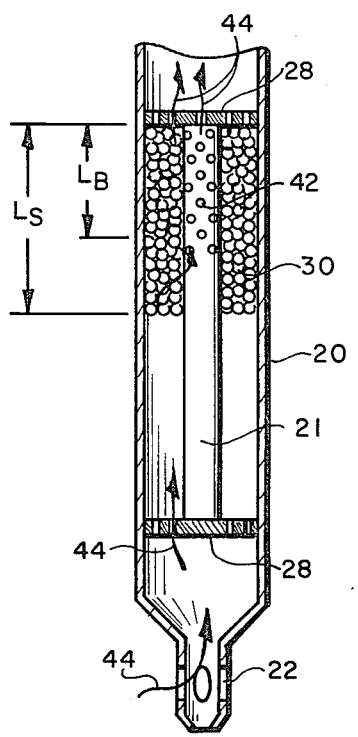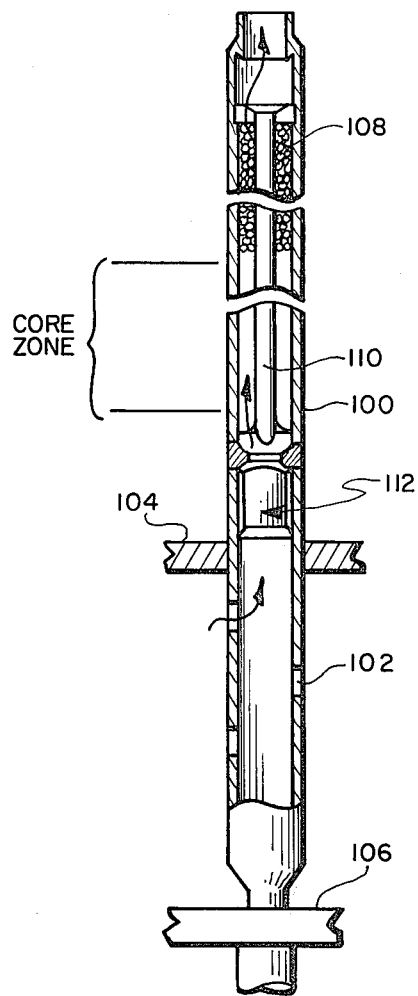
FIG. 3
FIG. 4

CONTROL FOR NUCLEAR REACTOR

BACKGROUND OF THE INVENTION

1. Field of the Invention

The invention relates to a nuclear reactor provided with automatic safe shutdown capability. The invention particularly relates to a nuclear reactor provided with a plurality of hydraulically supported spherical bodies having a high neutron absorption cross section, which fall by gravity into the core region of the reactor when the flow of supporting fluid is shut off.

2. Prior Art

Nuclear reactors usually incorporate an emergency shutdown system, which introduces some form of neutron absorbing material into the core. The emergency shutdown system has a basic requirement that injection of the neutron absorbing material should be simple, and that the neutron absorber should remain in the core in the event of any credible failure in the reactor system. One such system utilized heretofore was provided by the normal reactor control rods. The control rods are introduced through the top of the reactor and are raised and lowered generally by mechanical means such as a motor which operates via a clutch, gears, or the like. In an emergency, a clutch is disengaged and the control rods are allowed to fall into the core to shut down the reactor.

Such a system has not been altogether satisfactory. Specifically, there is a possibility that a mechanical device such as a clutch could not be disengaged, or that some fault may have occured which would distort the passage through which the control rods have to pass, such that they would bind, preventing full insertion of the rods into the core, and it would not be possible to shut down the reactor. Thus, numerous other backup shutdown systems have been proposed.

U.S. Pat. No. 3,147,188 suggests a reactor shutdown apparatus using neutron absorber balls. The shutdown apparatus comprises a restraint means for releasably restraining a multitude of discrete bodies of materials which are magnetic and possess neutron absorbing properties. The restraint means comprises at least one pair of magnetic pole pieces of opposite polarity, the apparatus being operated to release the discrete bodies by demagnetization of the pole pieces, whereby said bodies are moved under the influence of gravity into the core of the reactor.

U.S. Pat. No. 3,228,847 suggests a reactor control system which includes a control assembly for controlling neutronic flux. The control assembly comprises an inner tube extending from a nonactive region of the reactor into the active region, and an outer tube surrounding the inner tube and spaced therefrom. The outer tube has a closed end and the inner tube has an open end adjacent and spaced from the closed end of the outer tube. Neutron absorbing particles are positioned between the inner and outer tube for movement along the tube under the force of flow. The neutron absorbing particles are moved out of the active region of the reactor by fluid flow and fall back into the active region under the influence of gravity when the flow is shut off.

U.S. Pat. No. 3,257,286 suggests a ball-type control for a nuclear reactor. A number of elongated conduits are positioned in the nuclear reactor so that the first section of the conduit is located within the core and an adjoining second section is located exteriorly of the core. Each conduit holds a number of individual bodies, each of which contains a high neutron absorption cross-section material. The movement of the neutron absorber bodies within the conduits is achieved by providing a source of pressurized fluid available to each end of the conduit for selectively positioning the neutron absorber bodies within the first and second sections of the conduit. It is stated that a fission reactor can be started up, shut down, or reactivity controlled during reactor operations by varying the location of the absorber bodies.

U.S. Pat. No. 3,347,747 discloses a control organization and method for a nuclear reactor. The reactor is provided with a number of laterally spaced vertical passageways in the region of the core and distributed throughout the area thereof. The passageways include a lower portion which extends generally throughout the height of the core and an upper portion which extends above the core into the reactor vessel. Positioned within and confined in each passageway is a movable means which contains a poison and which is movable from a lower position within the region of the core to an upper position in the passageway, where it is generally above the core. The poison-containing means is moved by gravity to its lower position and is moved from its lower to its upper position by means of a fluid which is directed upward in the passageway.

U.S. Pat. No. 3,682,771 relates to an emergency nuclear reactor shutdown system for a gas cooled graphite moderated reactor. The system comprises a U-shaped tube with one limb located within the core and the other located externally thereof. Inside the tube for movement therein is a first column of spheres of neutron absorbing material. Connected to the external limb of the tube is a reservoir for a second column of spheres of non-neutron absorbing material of a greater weight than the other spheres. The two columns are in endwise contact inside the tube. When the second column of spheres is released, its greater weight urges the first column into the reactor core and retains it there.

While all the foregoing suggested techniques appear to offer advantages over reliance solely on a control rod system, they are not without problems. More particularly, the present inventors have found that when using, for example, hydraulically supported neutron absorbing bodies, that excessively high fluid flows are required to move the bodies from a core zone into a nonreactive zone. Further, when such flow has been established, the pressure drop across the bodies is excessively high. Moreover, even when maintaining sufficient pressurized fluid to maintain the required high pressure differential across the neutron absorbing bodies, it still is difficult, if not impossible, to maintain all of the bodies reliably out of the active region of the core. Another disadvantage of several of the proposed methods is that frequently it is desired to operate the reactor at less than full power, whereas in the prior methods which utilize hydraulically supported bodies, the flow required to move the bodies out of the core region and that flow at which the bodies start to fall back into the core region are very near the same. Thus, any significant decrease in flow results in the bodies dropping back into the core region. Obviously, there still is need for an improved reactor which includes a plurality of hydraulically supported neutron absorbing balls to provide an inherently safe shutoff of the reactor in the event of loss of coolant flow.

SUMMARY OF THE INVENTION

The present invention provides a nuclear reactor which includes inherently safe shutdown capability in the event of a loss of coolant flow. Broadly, the reactor comprises a pressure vessel and a core located within the vessel which contains a sufficient quantity of fissionable material to establish and sustain a chain-type fission reaction. A plurality of elongated conduits are disposed in a regular arrangement within the vessel, each of the conduits defining a fluid flow path and comprising a first section located within and extending throughout the core, and a second section located exteriorly of the core and positioned within each of the conduits in a sufficient quantity to substantially fill the first sections thereof. Each of the bodies are substantially spherical in shape and have a diameter of less than about one-half that of the narrowest part of the fluid flow path of the conduit, so that the bodies are freely movable through the conduits. The reactor further includes a first fluid connection to a lower part of the first section of each of the elongated conduits and a second fluid connection to an upper part of the passage of pressurized fluid therethrough while maintaining the reactor in operation. There also is provided a means for supplying pressurized fluid to the first fluid connection for moving all of the plurality of bodies from the first section to the second section of each of the elongated conduits and forming a hydraulically supported stacked bed of the bodies. Each of the elongated conduits is provided with means for preventing movement of the plurality of bodies from the first and second sections of the conduit into the rest of the reactor.

In accordance with the present invention, it has been found that to reliably form a hydraulically stacked bed of bodies, a bypass means also must be provided. The bypass means is located intermediate the second fluid connection and the second section of each of the conduits and includes a plurality of fluid passageways distributed along the length of the second section to provide a ratio of the length of the second section provided with fluid passageways to the length of the second section occupied by the stacked bed of bodies of from about 0.5:1 to about 1.2:1 for permitting a portion of the fluid to bypass the stacked bed of bodies during normal operation of the reactor. Each of the plurality of fluid passageways has a cross-sectional area of less than that of the bodies.

In accordance with a particularly preferred embodiment of the invention, the fluid passageways are formed by a plurality of axially extending rib portions located uniformly about the outer periphery of an elongated member located within the conduit member, which extend at least throughout a substantial portion of the second section of the conduit member.

In accordance with another embodiment, the means for supplying pressurized fluid to the first fluid connection further includes a shut-off valve for shutting off the flow of fluid through the conduit when the core temperature exceeds a desired predetermined value. The shut-off valve preferably is one which is thermally actuated, but may also be one which is actuated by an externally applied signal.

Various features of the novelty which characterize the invention are pointed out with particularity in the appended claims which form a part of this specification. For a better understanding of the invention, its operating advantages and specific objects attained by its use, reference should be made to the accompanying drawings and descriptive matter in which are illustrated and described respectively certain preferred embodiments of the invention.

BRIEF DESCRIPTION OF THE DRAWINGS

FIG. 3 is a diagrammatic illustration of one embodiment of the elongated conduit member shown in FIG. 1;

FIG. 4 is a detailed sectional view of one of the elongated conduit members shown in FIG. 1, provided with a thermally actuated shut-off valve;

DESCRIPTION OF THE PREFERRED EMBODIMENTS

Figure 1:
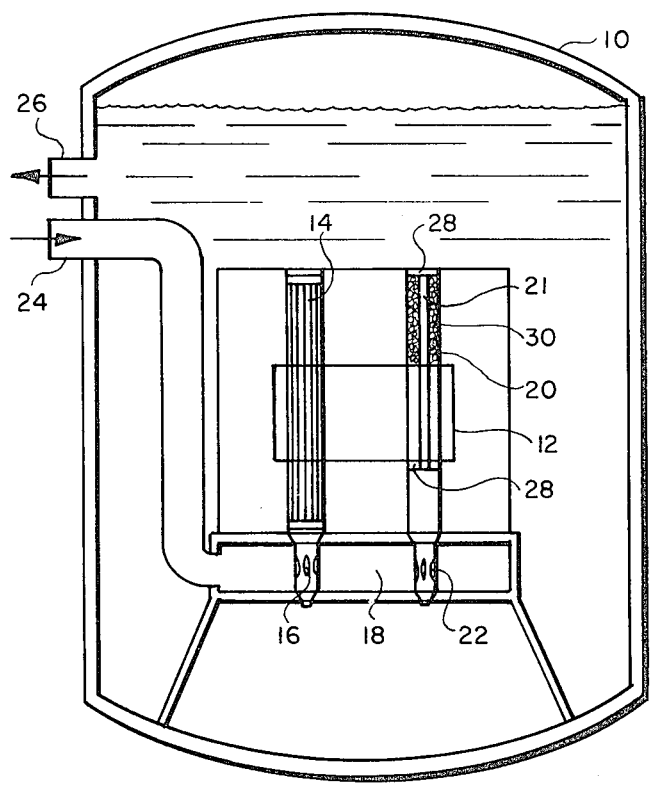
FIG. 1 is a diagrammatic representation of a nuclear reactor employing an embodiment of the present invention.

FIG. 1 shows a nuclear reactor which comprises a pressure vessel 10 containing a core 12. The core includes a plurality of fuel assemblies, a typical example of which is fuel assembly 14. The fuel assemblies contain a sufficient quantity of a fissionable material to establish and sustain a chain-type fission reaction. Typically, fuel assembly 14 also includes a plurality of fluid flow paths for the passage of a coolant fluid therethrough. Fuel assembly 14 has a portion provided with openings 16, which extend into a high pressure plenum 18 for the introduction of the coolant fluid. The reactor also includes a plurality of elongated conduit members as emplified by a conduit member 20, disposed in a regular arrangement within vessel 10 and having a first portion extending through the core 12 and a second portion located above the core. Each of the conduit members defines a fluid flow path and has a plurality of aperatures 22 located in high pressure plenum 18 for the introduction of the coolant fluid. Conduit member 20 contains a plurality of neutron absorber balls 30 in an amount sufficient to substantially fill that portion of the conduit located within the core. Also located within conduit member 20 are retaining means, such as orifice plates 28, for retaining neutron absorber balls 30 within a desired portion of the fluid flow path defined by conduit member 20.

During normal operation of the reactor, a pressurized coolant fluid, such as liquid sodium, is introduced from a source not shown via a conduit 24 into high pressure plenum 18. The coolant flows upwardly through fuel assembly 14 to carry away the heat generated in core 12. The hot sodium is removed via a conduit 26 for recovery of the heat. A portion of the coolant entering high pressure plenum 18 passes through conduit member 20 via the openings 22 and orifice plates 28. The flow of coolant hydraulically supports the neutron absorbing bodies 30 in the upper portion of conduit 20, where substantially all of the absorbing bodies 30 are outside of core 12. Conduit member 20 also includes an elongated tube member 21, which provides a means for a portion of the coolant to bypass part of the hydraulically supported neutron absorber bodies. Thus, in this embodiment, in the event of a loss of flow of the primary coolant, the hydraulically supported neutron absorber balls 30 automatically drop down into the core 12 providing an inherently safe automatic shutdown capability.

Figure 2:
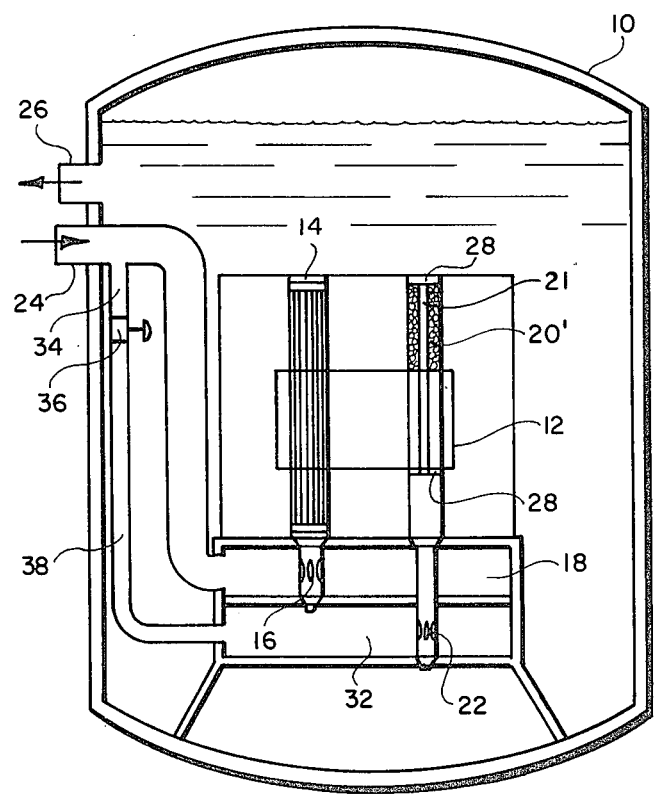
FIG. 2 is a diagrammatic representation of a nuclear reactor employing another embodiment of the present invention.

FIG. 2 shows a variation of the nuclear reactor arrangement of FIG. 1, wherein the openings 22 of elongated conduit member 20 extend into a low pressure plenum 32. In this embodiment the primary source of pressurized coolant fluid for fuel assembly 14 enters conduit 24 for introduction into high pressure plenum 18 as in FIG. 1. A side stream of that flow is withdrawn via a conduit 34 and passed through a pressure regulating means such as a control valve 36 and introduced via a conduit 38 into a low pressure plenum 32. An advantage of this arrangement is that valve 36 may be provided with an external control for testing the operation of the present invention by varying the flow of fluid to move neutron absorber balls 30 to any desired position. In addition, conduit member 20 may be so designed (as will be taught more fully later) such that only a nominal pressure and flow are required to maintain the neutron absorber balls 30 in the upper position out of core 12. An advantage of so doing is that the time required for the neutron absorber balls to drop into the core is reduced when the coolant flow through conduit 24 is interrupted. Still further, control valve 36 may be provided with automatic or manual control for emergency shutoff of the reactor even though coolant flow through conduit 24 is still within a normal operating range.

Referring now to FIG. 3, therein is depicted a diagrammatic illustration of one embodiment of the elongated conduit member of the present invention depicted in FIGS. 1 and 2. The elongated conduit member 20 is provided with passageways for the flow of the coolant fluid designated by the arrows 44. Coolant fluid maintains the neutron absorbing balls 30 in a hydraulically supported stacked bed having a length $L_s$ in an upper portion of conduit member 20 which is outside the core zone of the reactor. The elongated conduit member 20 further is provided with means for retaining the neutron absorbing balls within a certain defined area or zone of the fluid flow path, such as a retaining means, which may be in the form of aperatured plates 28, grids, screens or the like. In the embodiment depicted, there is provided a bypass means which comprises an elongated member 21, which is located coaxially within conduit member 20. Elongated member 21 is provided with a plurality of aperatures 42 located along its length for a distance $L_B$ to provide for the flow of fluid therethrough.

In accordance with the present invention, it has been found that the neutron absorbing bodies are reliably maintainable in a hydraulically supported stacked bed with a nominal flow rate and pressure drop when the ratio of $L_B$ to $L_s$ is within the range of from about 0.5:1 to 1.2:1, and the bypass means provides for bypass of from about 50% to about 85% of the total volume of fluid flowing through conduit member 20. Generally, it is preferred to provide a ratio of $L_B$ to $L_s$ of from about 0.9:1 to about 1:1 and provide for a bypass flow of from about 70% to 80% of the total flow of fluid through each of the conduit members. When no provisions are made to permit the bypass flow of the supporting fluid, retention of the bodies 30 in a stacked bed above the core zone is difficult and requires a high pressure drop across the bed and a significantly higher flow rate. Moreover, even when such provisions are made, the bodies cannot be maintained out of the core zone with the high degree of reliability required for operation of a nuclear reactor.

In FIG. 4 there is depicted another embodiment of the present invention wherein an elongated conduit member 100 has a lower end provided with a fluid connection such as a plurality of aperatures 102 for the introduction of a pressurized fluid. The portion containing aperatures 102 generally is confined within a pressurized fluid plenum defined, for example, by members 104 and 106. Conduit member 100 also includes a lower section located within a core zone of the reactor and an upper section which is outside the core zone, located vertically above the first section and in axial alignment therewith. Conduit member 100 also includes a plurality of substantially spherical neutron absorbing bodies 108, which, during normal operation of the reactor, are maintained above the core zone in a hydraulically supported bed by the flow of a coolant fluid therethrough. In the embodiment depicted, the bypass means includes an elongated member 110 located coaxially within conduit member 100, the details of which will be more clear with reference to FIGS. 5 through 7. In this particularly preferred embodiment, there also is provided a thermally actuated shut-off valve 112 for shutting off the flow of fluid through conduit member 100 when the core zone reaches some desired or pre-determined temperature.

Figure 5:
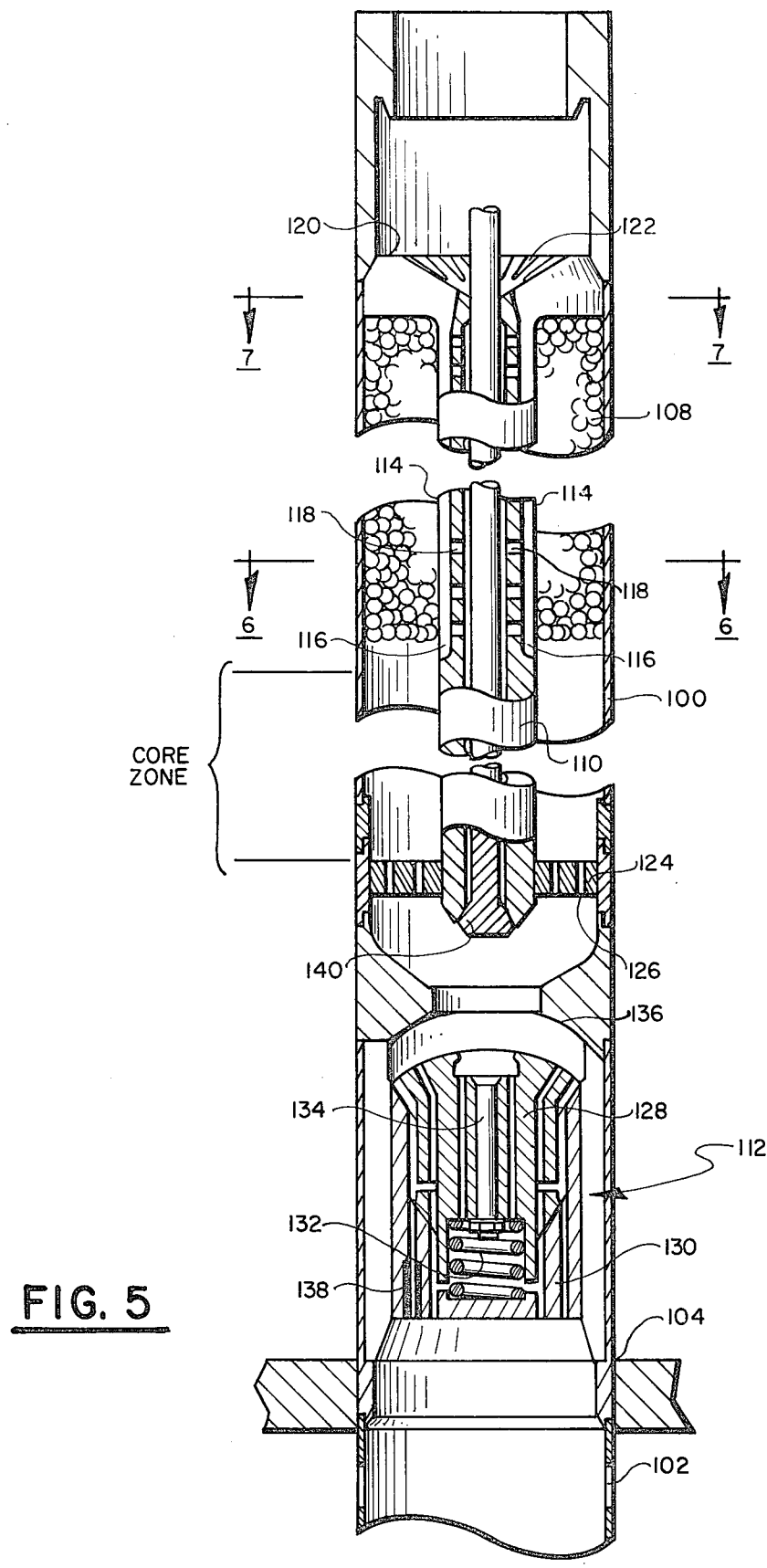
FIG. 5 is a diagrammatic and fragmentary sectional view of the conduit member shown in FIG. 4.
Figure 6:
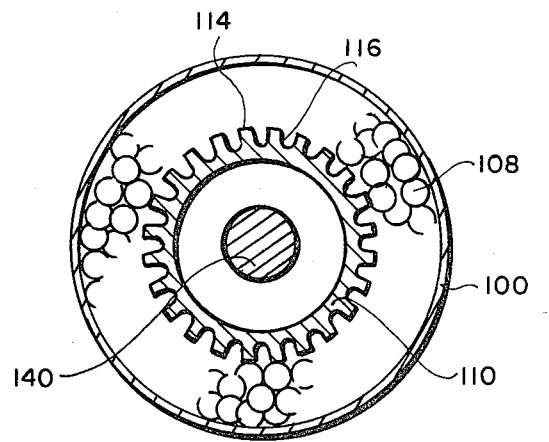
FIG. 6 is an enlarged plan view in section along lines 6—6 of FIG. 5.
Figure 7:
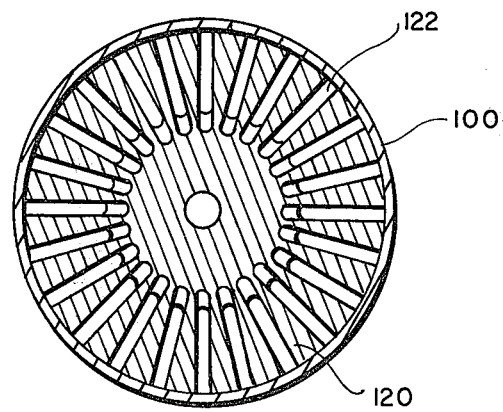
FIG. 7 is an enlarged plan view in section along lines 7—7 of FIG. 5.

FIG. 5 depicts a diagrammatic fragmentary sectional view of the conduit member shown in FIG. 4 and FIGS. 6 and 7 are enlarged sectional views taken along the corresponding lines in FIG. 5. In the depicted and particularly preferred embodiment of the invention, conduit member 100 includes a bypass means comprising an elongated member 110, which is provided with a plurality of axially extending ribs 114 located about its outer periphery which form a plurality of slotted fluid passageways 116. Optionally, or in addition thereto, elongated member 110 may be provided with a plurality of aperatures 118 about its periphery. Such slots or aperatures should each have a cross-sectional area substantially less than that of the neutron absorbing bodies to prevent their entering and clogging the fluid passageways formed. Generally, the bypass means will be formed such that its cross-sectional area will be less than about three-fourths the cross-sectional area of the neutron absorbing bodies, and preferably less than about one-third that of the neutron absorbing bodies.

In the embodiment depicted the upper end of elongated member 110 forms the restraining means for the neutron absorbing bodies 108 and is in the form of a substantially flat plate 120 provided with a plurality of slots 122. Another retaining means for the neutron absorbing bodies is located in conduit member 100 adjacent the lower end of the core zone, and in this embodiment is in the form of a plate 124 provided with aperatures 126 for the passage of fluid therethrough.

Advantageously, conduit member 100 also is provided with a means for shutting off the flow of fluid in the event the core temperature exceeds some pre-determined desired limit. Thus, there is provided a thermally actuated shut-off valve 112, which typically may comprise a permanent magnet 128, a ferromagnetic material 130, a biasing means such as a spring 132 and a fastener means 134 for connecting spring 132 and magnet 128. Spring 132 is held in compression by the attraction between permanent magnet 128 and ferromagnetic material 130. Ferromagnetic material 130 is selected from a material having a Curie point, which is exceeded in the event the core temperature of the reactor exceeds a pre-determined value, whereby the ferromagnetic material loses its magnetic properties, and permanent magnet 128 is biased by spring 132 into sealing engagement with an inner wall portion 136 of conduit member 100, shutting off the fluid flow path between aperatures 102 upstream of valve 112 and aperatures 126 downstream of the valve, thus also providing an automatic safe shutdown of the reactor when the core temperature exceeds a pre-determined temperature such as would occur in the event of a transient overpower condition.

It will be readily appreciated by those versed in the art that specific details of valve 112 could be modified from those depicted. In addition, the use of a fissile material such as at 138 to augment tripping of the valve assembly could be included. Further, in some instances, it may be desirable to include resistance heating elements to provide for external tripping of the device. When a thermally or externally actuated valve is used, it may be desirable to also include a means for resetting the valve to its normally open position. For example, elongated member 110 could be provided with an internal rod 140 for mechanically forcing members 128 and 130 back into contact with one another, once the temperature of member 130 had dropped below its Curie point. Still further, a flow shut-off valve could be located above the upper portion of the conduit member such as above flat plate 120 in FIG. 5, and could also be actuated by electrical, thermal, mechanical or other means.

When the coolant fluid is a high temperature liquid metal such as sodium, potassium, and the like, it frequently is desirable to also provide a means for returning the coolant (which is used to support the neutron absorbing bodies) to a low pressure zone which is at the coolant inlet temperature. For example, the coolant could be collected and returned to a primary coolant pump inlet. Since the coolant leaving the neutron absorber balls is at a substantially lower temperature than that passing through the fuel assemblies, it may be desirable to make such provisions to minimize potential thermal distortions in the reactor structure above the core due to undefined mixing paths of the respective streams of coolant and to obtain more efficient utilization of the reactor coolant.

It also will be appreciated that the neutron absorber bodies need not be precisely spherical and could be, for example, ellipsoidal. In addition, whereas in the preferred embodiments depicted, the bypass means includes openings, aperatures or slots in a centrally located elongated member, it will be equally apparent to those versed in the art that the bypass means could include slots or aperatures in the outer periphery of the conduit member for passage of the fluid into an outer surrounding housing. Thus, while the invention has been described with respect to certain embodiments, it will be appreciated that many modifications and changes may be made by those skilled in the art without departing from the spirit of the present invention. We intend, therefore, by the appended claims to cover all such modifications and changes as fall within the true spirit and scope of the invention.

What is claimed is:

1. A nuclear reactor comprising a pressure vessel, a core located within said vessel and containing a sufficient quantity of fissionable material to establish and sustain a chain-type fission reaction;

a plurality of elongated conduits disposed in a regular arrangement within said vessel, each of said conduits defining a fluid flow path and comprising;

a first section located within and extending through said core and a second section located exteriorly of said core and positioned above said first section;

a plurality of bodies comprising a high neutron absorption cross-section material positioned within each of said conduits in a sufficient quantity to substantially fill the first sections thereof, each of said bodies being substantially spherical in shape and having a diameter of less than about one-half that of the narrowest part of the fluid flow path of said conduit so that said bodies are freely movable through said conduits;

a first fluid connection to a lower part of the first section of each of said elongated conduits and a second fluid connection to an upper part of the second section of each of said elongated conduits and forming a hydraulically supported stacked bed of said bodies;

means for preventing movement of said plurality of bodies beyond said first and second sections of each of said elongated conduits; and bypass means located intermediate said second fluid connection and said second section of each of said conduits, said bypass means including a plurality of fluid passageways distributed along the length of said second section to provide a ratio of the length of said second section provided with said fluid passageways to the length of said second section occupied by the stacked bed of said bodies of from about 0.5:1 to 1.2:1 for permitting a portion of said fluid to bypass the stacked bed of bodies during normal operation of the reactor, each of said plurality of fluid passageways having a cross-sectional area less than that of said bodies.

2. A nuclear reactor comprising a pressure vessel, a plurality of separate uniform fuel element assemblies disposed within said vessel to form a core, said assemblies containing a sufficient quantity of fissionable material to establish and sustain a chain-type fission reaction;

a plurality of elongated vertical conduits of uniform cross section disposed in a regular arrangement within said vessel, each of said conduits defining a fluid flow path and comprising a first section located within and extending through said core and a second section located superjacent to said core and in axial alignment with said first section;

a plurality of spherical bodies positioned within each of said conduits in a sufficient quantity to substantially fill the first section thereof, said spherical bodies containing a high neutron absorption cross-section material, and having a substantially uniform diameter sufficiently smaller than said fluid flow path, such that said bodies are freely movable therethrough;

a first fluid connection to the lower part of each of said conduits, a second fluid connection to the upper part of each of said conduits, for the passage of pressurized fluid therethrough while maintaining the reactor in operation;

means for preventing movement of said plurality of bodies beyond said first and second sections of each of said elongated conduits;

means for supplying pressurized fluid to said first fluid connection for moving all of said plurality of bodies from said first section to said second section of each of said elongated conduits and forming a hydraulically supported stacked bed of said bodies; bypass means located intermediate said support fluid connection and said second section of each of said conduits, said bypass means including an elongated member located coaxially within said conduit member and provided with a plurality of fluid passageways distributed along its length at least throughout a substantial portion of the second section of said conduit member, to provide a ratio of the length of said elongated member provided with fluid passageways to the length of said second section occupied by the stacked bed of said bodies of from about 0.5:1 to 1.2:1, for permitting from about 50% to 85% of said fluid of said fluid to bypass the stacked bed of bodies during normal operation of the reactor, each of the plurality of fluid passageways having a cross-sectional area less than that of said bodies.

3. The nuclear reactor of claim 2 wherein said plurality of fluid passageways comprises a plurality of axially extending rib portions located uniformly about the outer periphery of said elongated member.

4. The nuclear reactor of claim 3 where said means for supplying pressurized fluid to said first fluid connection further includes a thermally actuated shut-off valve for shutting off the flow of fluid through said conduits when said core exceeds a desired pre-determined temperature.

5. The apparatus of claim 2 wherein said elongated member is provided with a plurality of aperatures to form said fluid passageways, each of said aperatures having a cross-sectional area substantially less than that of said bodies.

* * * * *